United States Patent [19]

Kossila

[11] Patent Number: 5,411,359

[45] Date of Patent: May 2, 1995

[54] TRANSPORT TRAILER FOR LIFTING AND MOVING A LOAD AND METHOD FOR EFFECTING SUCH MOVEMENTS

[75] Inventor: Pekka Kossila, Kouvola, Finland

[73] Assignee: Liftec Products OY, Tampere, Finland

[21] Appl. No.: 965,361

[22] PCT Filed: Jun. 19, 1991

[86] PCT No.: PCT/FI92/00113

§ 371 Date: Dec. 17, 1992

§ 102(e) Date: Dec. 17, 1992

[87] PCT Pub. No.: WO92/18350

PCT Pub. Date: Oct. 29, 1992

[30] Foreign Application Priority Data

Apr. 18, 1991 [FI] Finland ................................. 911870
Jun. 19, 1991 [FI] Finland ................................. 912985

[51] Int. Cl.$^6$ ............................................. B60P 1/64
[52] U.S. Cl. .................................... 414/498; 414/786; 280/425.2
[58] Field of Search ............... 414/498, 786, 500; 410/46; 280/400, 423.1, 425.2, 490.1

[56] References Cited

U.S. PATENT DOCUMENTS 2,858,950 11/1958 Martin ........................... 280/425.2
4,060,145 11/1977 Kingman et al. ................. 280/423.1

FOREIGN PATENT DOCUMENTS 84658    9/1983  European Pat. Off. ............ 414/498
1545843 10/1968  France .
1902346  9/1969  Germany ........................... 414/498
76026319 8/1978  Sweden .
562709   6/1975  Switzerland .
1500502  2/1978  United Kingdom .

Primary Examiner—Michael S. Huppert
Assistant Examiner—Gregory A. Morse
Attorney, Agent, or Firm—Pollock, Vande Sande & Priddy

[57] ABSTRACT

A method for providing the lifting effect of a lifting transport trailer, wherein the lifting transport trailer comprises as main parts a frame (u) which has essentially a horizontal carrying planar surface (KT) or the like, a rotating wheel (PE) and a lever mechanism. According to the method, the factors on the quantity of the moments applying at the pivot point (P) between second frame lever (N) and the frame (u) are so selected that during shifting of the lifting transport trailer, the lifting transport trailer functions as a stiff body at least in two positions. In the first position, the sum of moments applying at the pivot point (P) applies in the first direction so that the lever mechanism formed by the lever frames (M, N) and at least one power transmission element (VE) is supported against the first limiter means (R1) in the frame (u), the carrying surface (KT) being in the lower position. Further according to the method, the factor on the quantity of the moments applying at the pivot point (P) between the second lever frame (N) and the frame (u) is so changed that the sum of moments applying at the pivot point (P) of the second lever frame (N) applies in a second direction, opposite to the first direction, wherein during shifting of the lifting transport trailer, the lifting transport trailer functions as a stiff body in the second position so that the lever mechanism formed by the frame levers (M, N) and the transmission element (VE) is supported against the second limiter means (R2) or the like, the carrying plane (KT) being in the upper position. The invention relates also to a lifting transport trailer.

12 Claims, 7 Drawing Sheets

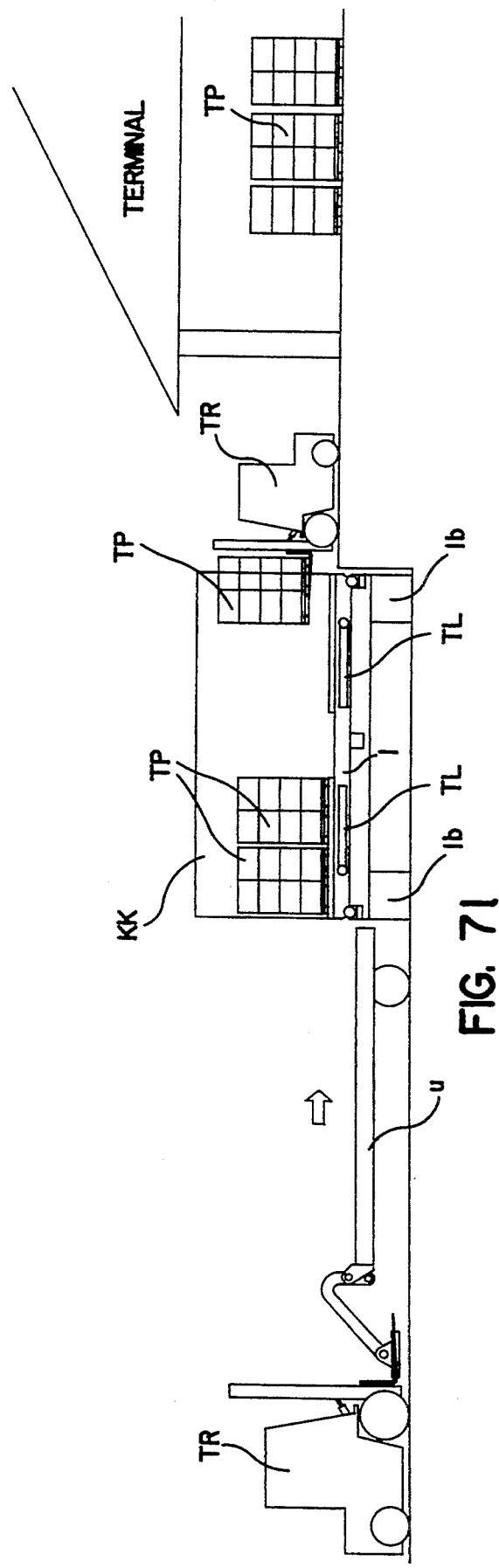

TRANSPORT TRAILER FOR LIFTING AND MOVING A LOAD AND METHOD FOR EFFECTING SUCH MOVEMENTS

The invention relates to a method for providing the lifting effect of a lifting transport trailer, wherein the main parts of the trailer-comprise a frame with an essentially horizontal carrying surface or the like, and a lever mechanism comprising:

a first frame lever which is articulated to the frame to rotate substantially in a vertical plane with respect to the frame and which is connectable to an apparatus or the like provided with means for vertical motions;

a second frame lever which is articulated to the frame to rotate substantially in a vertical plane with respect to the frame and which is equipped with at least one rotating element such as a bearing wheel; and at least one power transmission organ functioning between the first and the second frame lever for transmission of the vertical rotational motion of the first frame lever with respect to the frame of the said lifting transport trailer into the rotational motion of the second frame lever and thus for the change, limited by limiter-means or the like, of the vertical distance between the carrying surface of the frame and said at least one rotating organ, particularly in connection with operations related to the loading of the lifting transport trailer.

The lifting transport trailer according to the present invention is intended particularly for handling of goods, and the method according to the invention and the lifting transport trailer used in it are particularly advantageously embodied in the principle of self-loading and self-unloading, used for transportation of loads on pallets. However, the invention is not limited to uses of this kind only, but naturally also other embodiments suitable for use in the handling of goods are possible.

As to the principle of self-loading and self-unloading presented above, the prior art in this field can be illustrated by reference to the patent FI-79061. From this publication, a combination of a lifting transport trailer and a drawgear is known, which is used in combination with a drawing vehicle. In the embodiment according to the said patent, the motion of the frame lifting and lowering a load placed on a bottom is hydraulically operated. A lifting transport trailer made according to this principle is functional; however, it has the disadvantage of structural complexity, which increases the expenses of service, repair and manufacture. An apparatus of relatively complex technology, it is also subject to faults, which increase the risk of damage and thus of stand-stills e.g. related to loading and unloading of ships at harbour terminals. For reasons of efficient use of tied-up capital, it is particularly at sites of this kind that reliable lifting transport trailers are required. In use, the lifting transport trailer according to the patent has the disadvantage that the keyboard for controlling the operations of the lifting transport trailer is, in principle, placed loose within the cab of the drawing vehicle, so that in certain situations in practice, the keyboard may be difficult to control by the driver of the drawing vehicle.

Further, the publications CH-52,709 and GB-1,500,502 can be introduced as prior art to the invention. From these publications, mechanical solutions are known, in which a carrying surface driven by a drawing vehicle, running on wheels and supporting the load is movable in the vertical plane with respect to the wheels. A disadvantage of the embodiments according to these said publications is that they cannot be moved away from below or below the load, and they are thus not suitable for embodiments having the particular principle of self-loading and self-unloading. Moreover, it must be stated particularly of the solution according to GB-1,500,502 that the vertical force e.g. on its first lever arm which is used to move the lever arm., or the removal of the force, always induces a change in the vertical distance between the frame (i.e. the carrying surface) and the wheels, irrespective of whether there is a load on the carrying surface or not. In other words, irrespective of the load, the movement of the first lever arm in the vertical direction always, within the limits by the limiter means in the apparatus, induces a change in the distance between the frame and the wheels, so that e.g. in the lower position, the frame rests on the ground or on a corresponding horizontal bottom. Because of this feature, the solution according to the said patent is unsuitable also for many other uses.

It is an aim of the present invention to eliminate substantially the drawbacks of prior art presented above and to achieve a reliable method with various uses for providing the lifting effect of a lifting transport trailer. Thus, the method according to the invention is particularly intended to improve the level of prior art in the field. For achieving these purposes, the method according to the invention is mainly characterized by the following steps:

selecting the factors effecting the magnitude of the moments at the point of articulation between a second frame lever and the frame in a manner such that the lifting transport trailer functions during shifting of the lifting transportation trailer as a stiff body at least in two positions, wherein, in the first position, the sum of the moments at the point of articulation acts in a first direction so that the lever mechanism comprising the frame levers and at least one power transmission element is supported against a first limiter means or the like in the frame, the carrying surface being in the lower position, and changing at least one factor effecting the magnitude of the moments at the point of articulation between the second frame lever and the frame in a manner such that the sum of moments at the point of articulation of the second frame lever is turned in a second direction which is opposite to the first direction, wherein the lifting transport trailer functions during shifting of the lifting transportation trailer as a stiff body in the second position so that the lever mechanism comprising the frame levers and at least one power transmission element is supported against a second limiter means or the like in the frame, the carrying surface being in the upper position.

Consequently, this solution has the advantage that the lifting transport trailer can be shifted as a stiff piece, the carrying surface being in the lower position, so that the height position of the first frame lever is freely adjustable according to the respective shifting situation. In a situation of load shifting, where the carrying surface of the lifting transport trailer is to be lifted in the upper position, this can be performed by simple operations which will be described in more detail further on, and- /or in connection with the loading stage, which is advantageous particularly when the lifting transport trailer is used according to the principle of self-loading and self-unloading. Thus, it must further be noted that the lifting transport trailer functions as a stiff body also in the upper position, wherein the height position of the second frame lever is freely adjustable within functional limits to suit each shifting situation. A particular advantage is gained by the fact that, in certain embodiments of the invention, the height position of the carrying surface is freely adjustable between the upper and lower positions, irrespective of the load on the carrying surface; namely, the lifting transport trailer can be used also in other methods of handling goods, in addition to the principle of self-loading and self-unloading.

In applying of the principle of self-loading and self-unloading, one embodiment of the method according to the-invention, in which the lifting transport trailer is placed below the load lifted by a support device from the horizontal level for the purpose of shifting the load, the carrying surface being in the lower position, and is lifted to bring the load to the support by the carrying surface, particularly for purposes of shifting the load, is characterized by the following steps:

lifting the first frame level upwards in the first step for bringing the load to the support of the carrying surface, wherein the lifting transport trailer is pivoted as a stiff body in the first position so that the carrying surface meets the load and/or the support device connected to the load, with which the load is supported in the lifted position, and the frame is subjected to a force directed by the said load and/or the support device changing the direction of the moments effective at the pivot of the second frame lever to the opposite and thus bringing the lifting transport trailer to a second position, and placing the load in relation to the carrying surface in a manner such that the position of the joint center of gravity of the frame and the load in relation to the position of the center of gravity of the frame is changed for arresting the lifting transport trailer in a second position.

Consequently, the solution presented above provides an automatic function during loading and naturally during unloading, which is based on a mechanic principle and triggered by the meeting of the load and the carrying surface during pivoting of the lifting transport trailer as a stiff body upwards in the first position and, in an unloading situation, by the meeting of the support device of the load and the bottom during rotation of the lifting transport trailer as a stiff body downwards in the second position.

Advantageously, according to an alternative embodiment of the invention, the lever relations of the first and/or the second frame lever and/or the position of the centre of gravity of the frame are changed for achieving the first or the second position. As already mentioned, these solutions can be used separately and/or in combination with the principle of self-loading and self-unloading mentioned above.

Furthermore, the invention relates to a lifting transport trailer, which is mainly characterized by the features disclosed in the characterizing part of the attached independent claim related to the lifting transport trailer. The attached dependent claims related to the lifting transport trailer disclose some advantageous embodiments thereof.

BRIEF DESCRIPTION OF THE DRAWINGS

One advantageous embodiment of the invention is illustrated in more detail in the following description with reference to the attached drawings. In the drawings, FIGS. 7a–l show phases of the method and use of the lifting transport trailer according to the invention in handling of interchangeable containers equipped with standing legs on a support bottom as seen from the side.

In the following, the theoretical basis of the method according to the invention is illustrated with reference to FIGS. 1, 2a and 2b particularly to describe the factors on the quantity of the moments applying at the pivot point between the second lever frame and the frame.

Figure 1:
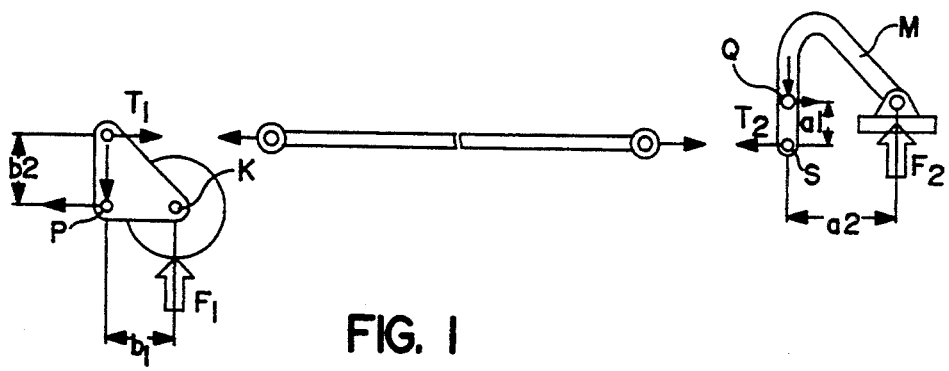
FIG. 1 shows a fractional view of one lever mechanism of the lifting transport trailer used in the method according to the invention.

According to the notations in FIG. 1, the condition for the balance of the lever mechanism is $$T_1 = T_2, \qquad (1)$$

further, the condition for the moment balance around point P $$F_1 * b_1 - T_1 * b_2 = 0 => T_1 = \frac{F_1 * b_1}{b_2} \qquad (2)$$

and the condition for the moment balance around point Q $$F_2 * a_2 - T_2 * a_1 = 0 => T_2 = \frac{F_2 * a_2}{a_2 a_1} \qquad (3)$$

(2) and (3) being substituted in the equation (1), it follows that:

$$\frac{F_1 * b_1}{b_2} = \frac{F_2 * a_2}{a_1} \qquad (4)$$

If $T_1 < T_2$, point K rotates counterclockwise in relation to point P and point S rotates clockwise in relation to point Q.

If $T_1 > T_2$, point K pivots clockwise in relation to point P and point S pivots counterclockwise in relation to point Q.

Figure 2A:
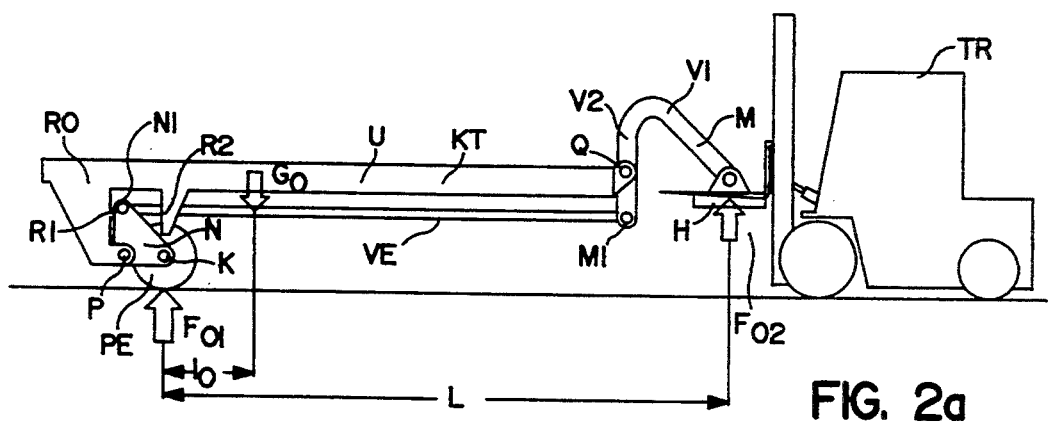
FIGS. 2a, 2b show side views of the lifting transport trailer with lever mechanism according to FIG. 1 when unloaded (2a) and when lifted (2b) in connection with a tractive unit, such as a forklift truck.

Further, using the notations in FIG. 2a, the condition for balance is $$G_0 - F_{01} - F_{02} = 0 \rightarrow F_{01} = G_0 - F_{02}, \tag{5}$$

wherein the condition for moment balance around point K is $$F_{02} * L - G_0 * l_0 = 0 \Rightarrow F_{02} \frac{G_0 * l_0}{L}, \tag{6}$$

when (5) and (6) are combined, it follows that:

$$F_{01} = G_0 - \frac{G_0 * l_0}{L} \tag{7}$$

When unloaded, the equations $F_{01} = F_1$ and $F_{02} = F_2$ are in force; thus (6) and (7) can be substituted in the equation (4), whereby it follows that $$\left(1 - \frac{l_0}{L}\right) * \frac{b_1}{b_2} = \frac{l_0 * a_2}{L * a_1} \tag{8}$$

Consequently, the operation according to the invention being generated without loading so that the frame lever N of the elements pivots counterclockwise around point P towards the limiter means R1 so that the frame lever N and thus the carrying surface is placed at the point of the pivoting element in the lowest position in relation to the bottom. The factors involved are presented in the inequality statement (9).

$$\left(1 - \frac{l_0}{L}\right) * \frac{b_1}{b_2} < \frac{l_0 * a_2}{L * a_1} \tag{9}$$

Figure 2B:
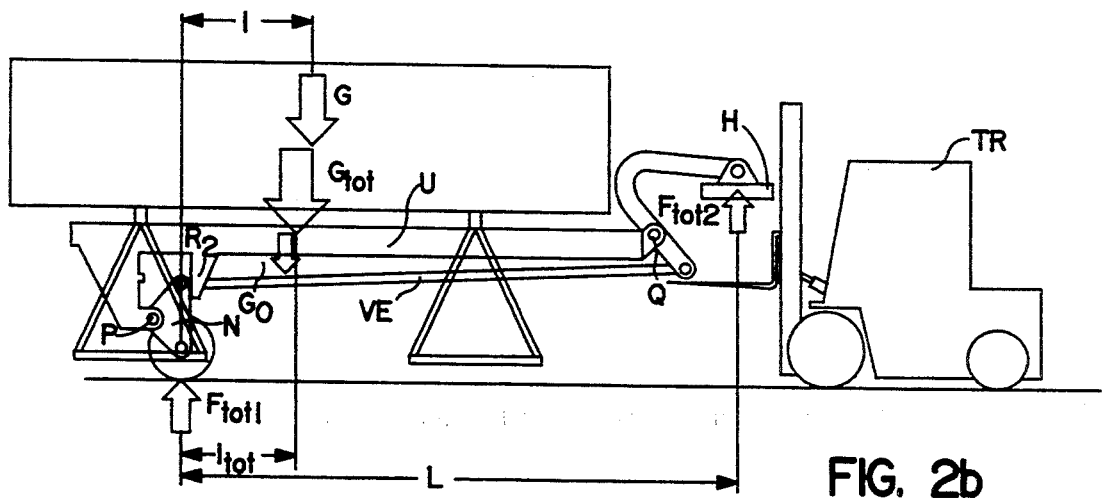

Using the notations of FIG. 2b and the equation (8), it follows that:

$$\left(1 - \frac{l_{tot}}{L}\right) * \frac{b_1}{b_2} = \frac{l_{tot} * a_2}{L * a_1} \tag{10}$$

Furthermore, it is noted that $$G_{tot} = G + G_O \tag{11}$$

and $$l_{tot} = \frac{(G_0 * l_0 + G * l)}{G_{tot}} \tag{12}$$

Consequently, the operation according to the invention when loaded being generated so that the frame lever of the rotating elements pivots clockwise around point P towards the limiter means R2 and the frame lever N is placed at the point of the pivoting element at the uppermost position in relation to the bottom, the factors involved are presented in the inequality statement (13), which is a combination of the equations (10) to (12).

$$\left(1 - \frac{G_0 * l_0 + G * l}{L * G_{tot}}\right) * \frac{b_1}{b_2} > \frac{G_0 * l_0 + G * l}{L * G_{tot} * a_1} * a_2 \tag{13}$$

Thus, it is a requirement for the operation of the lifting transport trailer that when substituted, the factors selected fulfill the inequality statements (9) and (13) simultaneously. The notations used hereabove are presented in a list at the end of the description.

With particular reference to FIGS. 2a and 2b, the lifting transport trailer according to the invention has a frame u; the first frame lever M is fixed with a joint Q to one end of the frame u. As illustrated in FIGS. 2a, 2b and 3, the first frame lever M, seen from the side, has a downwards directed U-shape, particularly when the lifting transport trailer is in the first position according to FIG. 2a. The first arm part V1 of the first frame lever M is shaped as a shaft, wherein the free end of the same is equipped with an attachment device, such as an articulated bushing-type coupling means H for connecting the fork part of a forklift TR performing a vertical movement to the lifting transport trailer. In the embodiment shown in FIGS. 2a, 2b and 3a-g, the middle section of the second arm part V2 of the first frame lever M is connected to a joint Q. Further, a power transmission element VE is connected with joint M1 to the free end of the second arm part V2. In the embodiment shown, this element VE is a bar or wire cable movable between the joint points M1 and N1 in the longitudinal direction of the frame. The joint point N1 is formed between the power transmission element VE and the second frame lever N. The second frame lever N, then, is articulated with joint P to the bracket support connected to the frame part RO directed downwards from the carrying surface KT of the frame u. Furthermore, at least one rotating element PE is mounted in bearings at the bearing point K to connect with the second frame lever N. The embodiment of the lifting transport trailer according to FIGS. 2a, 2b and 3 being in its first position, i.e. the lower position, the part R1 in the downwards directed frame part RO functions as the first limiter means (limiter means R1). The second frame lever N has a triangular shape, in which case the said joints N1, P and K are placed at the corners of the triangular shape.

Furthermore, a second limiter means R2 is formed in the frame by a bracket support directed downwards from the carrying plane KT of the frame u for the second position, i.e. the upper position, of the presented embodiment of the lifting transport trailer.

The use of the embodiment of the lifting transport trailer according to FIGS. 2a and 2b as an application of the self-loading and self-unloading principle is particularly shown in stages in FIG. 3. FIG. 3a shows the stage of shifting the lifting transport trailer from the bottom under the load KK lifted by means of a support device TL. The fork of the forklift TR is used to pivot (around the bearing point K) the unloaded lifting transport trailer in its first position upwards counter-clockwise, as shown in FIG. 3b, until the carrying surface KT meets the load KK and/or the support device TL, and the lifting transport trailer is shifted to the second position in the manner described above, as shown in FIG. 3c. Further, the pivoting motion of the lifting transport trailer as a stiff body is continued in its second position to the position shown in FIG. 3d to make the carrying surface KT horizontal, so that the forklift TR can carry the combination of the load KK and the support device TL.

Figure 3A:
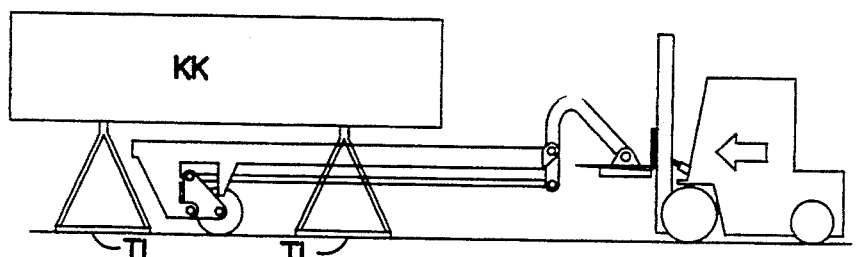
FIGS. 3a–g show stages of applying the principle of self-loading and self-unloading using the method according to the invention and the lifting transport trailer with the mechanism shown in FIGS. 1 and 2a, 2b, FIGS. 4–6 show schematically some alternative embodiments of the lifting transport trailer according to the invention, particularly the construction of the lever mechanism.
Figure 3B:
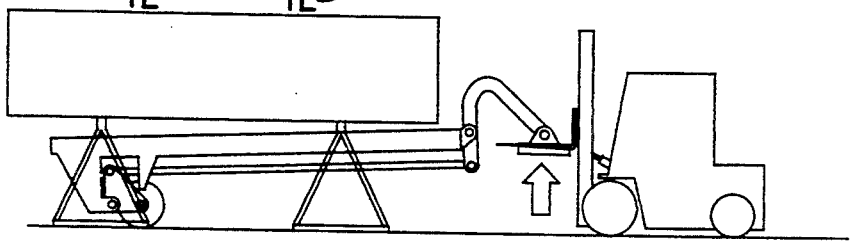
Figure 3C:
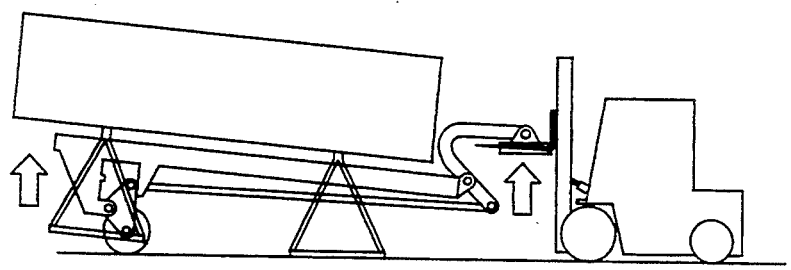
Figure 3D:
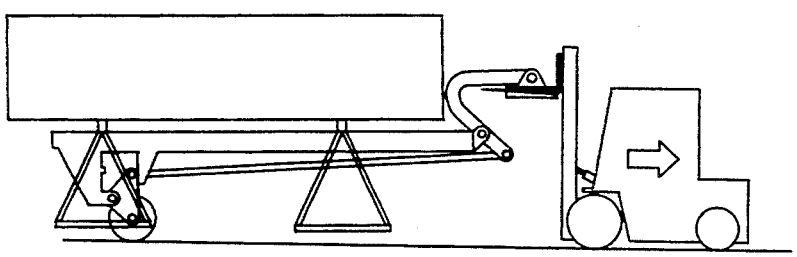
Figure 3E:
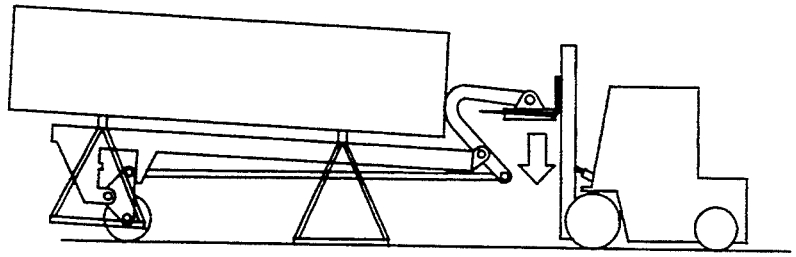
Figure 3F:
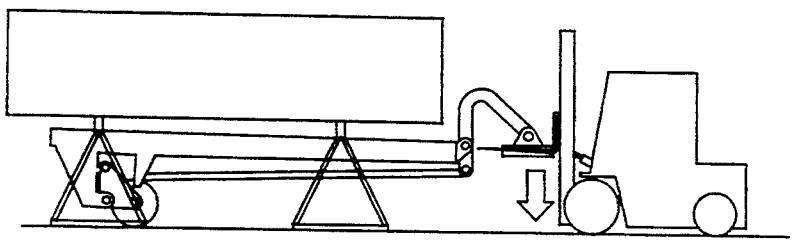
Figure 3G:
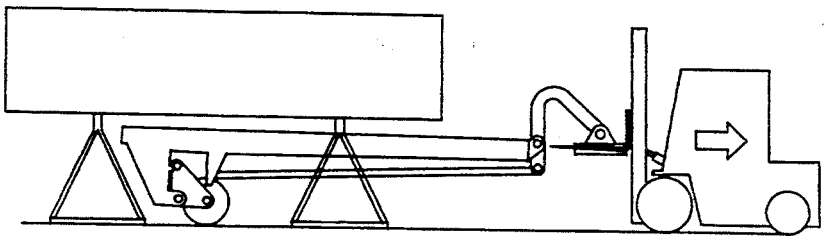

FIGS. 3e to 3g show the corresponding measures in connection with unloading the load KK and the support device TL from the carrying surface of the lifting transport trailer. These stages are essentially the reverse of those described above.

Figure 4:
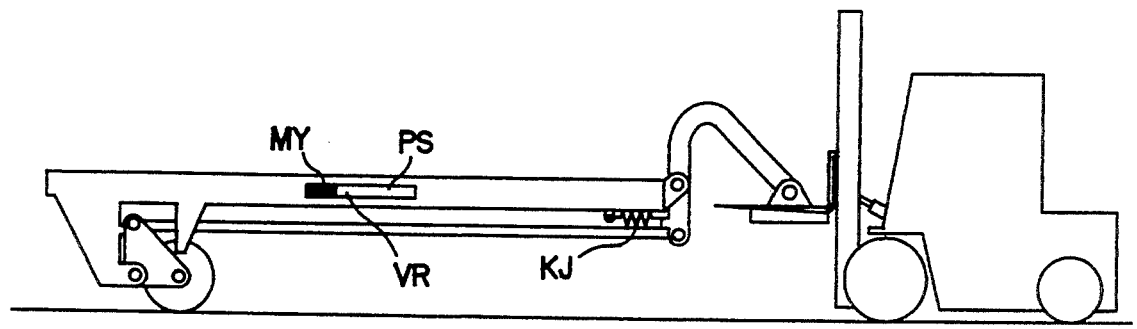

FIG. 4 shows an embodiment of the lifting transport trailer, in which a release spring KJ is placed in the lifting transport trailer corresponding to that presented above. The release spring KJ is placed so that its force will further the shifting of the lifting transport trailer from the second position to the first position, i.e. the lower position, shown in FIG. 4. A release spring KJ of this kind can be placed in one or several points in the construction. In the embodiment shown in FIG. 4, it is placed between the frame u and the joints Q and M1 in the second arm part of the first frame lever M.

Figure 5:
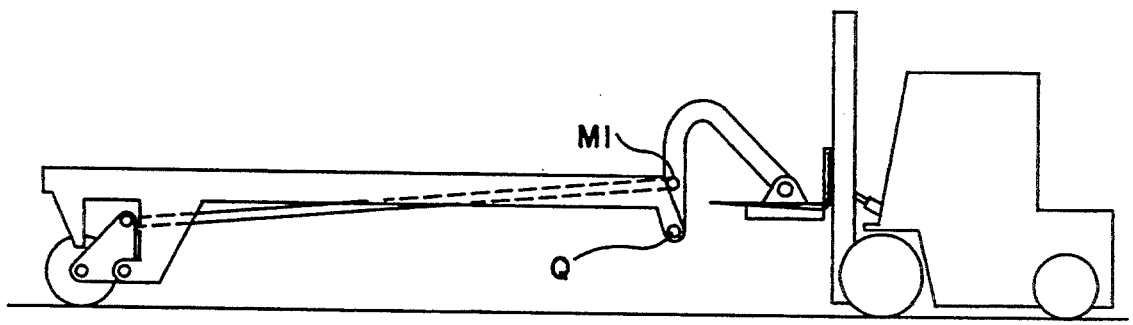

FIG. 5 shows an alternative embodiment, in which the places of the joints M1 and Q as well as the direction of rotation of the second frame lever N have been changed. For this purpose, a downwards directed bracket support has been formed in the front section of the frame u, in which the said joint Q is made.

Figure 6:
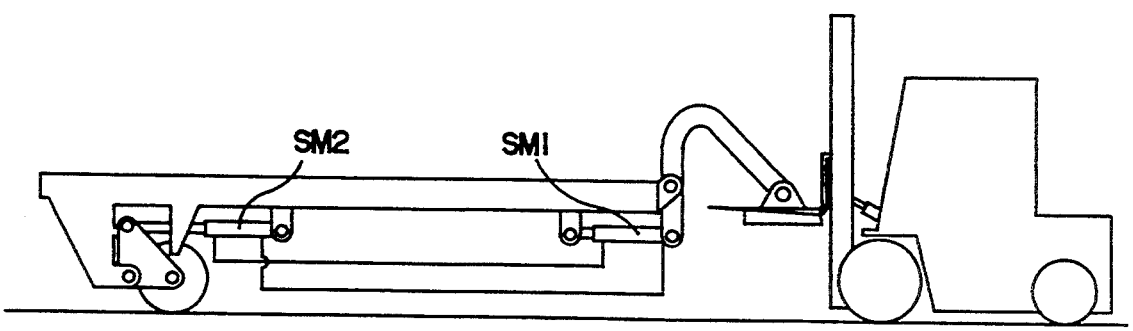

FIG. 6 shows an embodiment of the power transmission element VE which uses pressure medium. For this purpose, pressure-medium operated cylinder-piston combinations SM1 and SM2 are connected in the solid, downwards directed bracket supports in the frame u and in the frame levers M and N, respectively, in which the closed circulation of pressure medium is arranged so that the first cylinder-piston combination SM1 being in its shortest length, the second cylinder-piston combination SM2 is in its greatest length correspondingly. This method is used to effect the operation shown in FIGS. 2a and 2b.

Some embodiments of the lifting transport trailer according to the invention were presented above, but with reference to what was presented, it should be clear for an artisan in the field that also several other applications are feasible. For example in FIG. 4, a mechanism PS is presented for shifting the centre of gravity of the frame u so that the lifting transport trailer can be shifted from the first position shown in FIG. 4 to the second position also when unloaded. The mechanism for shifting the centre of gravity may comprise a mass unit MY which is movable in the groove VR or the like in the longitudinal direction of the frame u and whose shifting to the right in the said groove VR in FIG. 4 makes it possible to shift the lifting transport trailer to the second position. Furthermore, it is clear that with reference to the inequality statements (9) and (13), also the lever relations $a_1/a_2$ and $b_1/b_2$ can be changed. In the simplest manner, this can probably be done by changing the lever relation $a_2$, in which case the first arm part V1 of the first frame lever M with U-form can be made to have, for example, a telescopic structure.

Figure 7A:
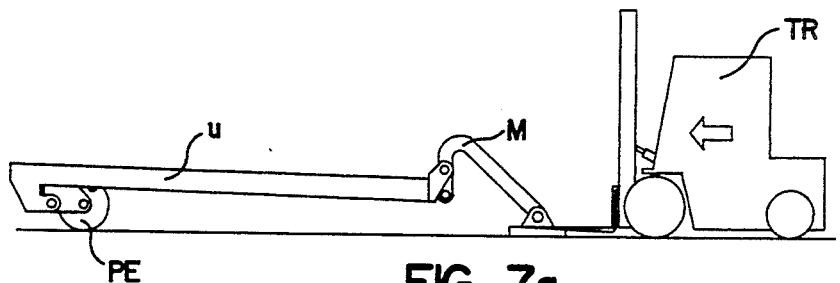
Figure 7B:
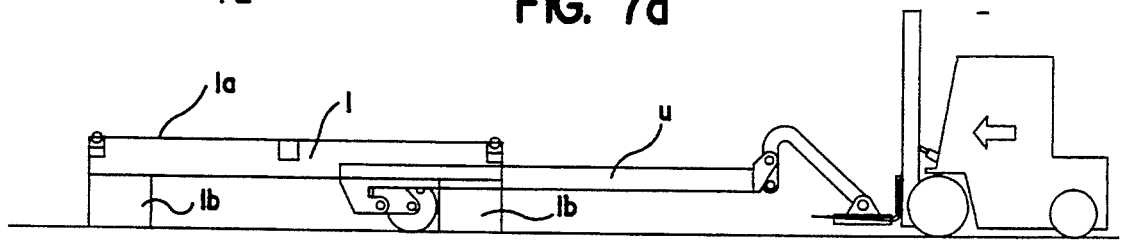
Figure 7C:
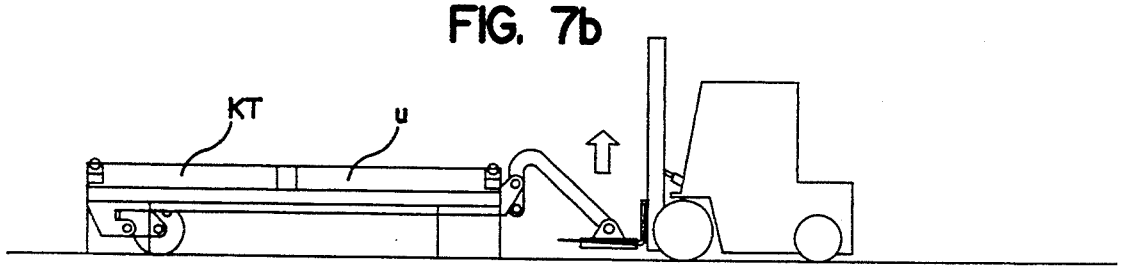
Figure 7D:
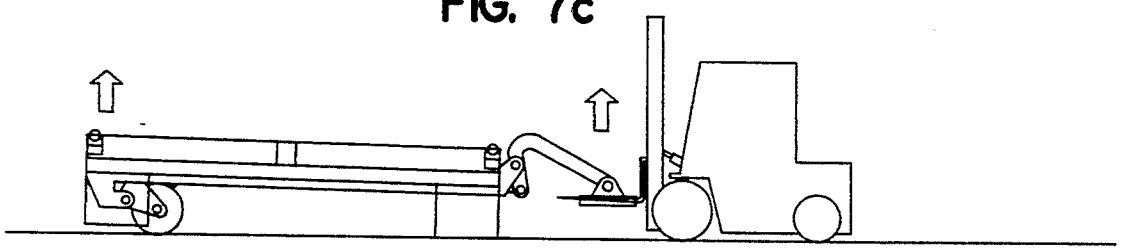
Figure 7E:
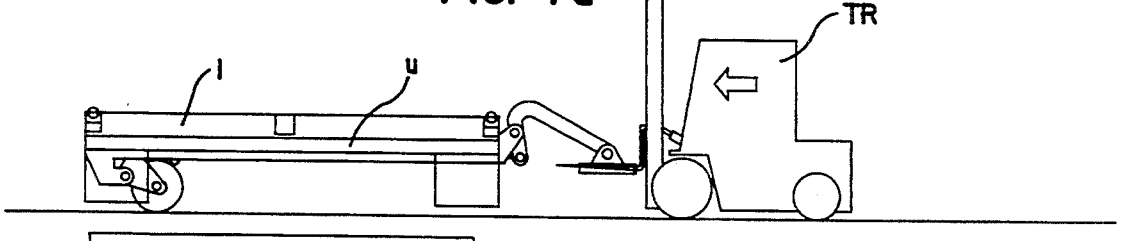
Figure 7F:
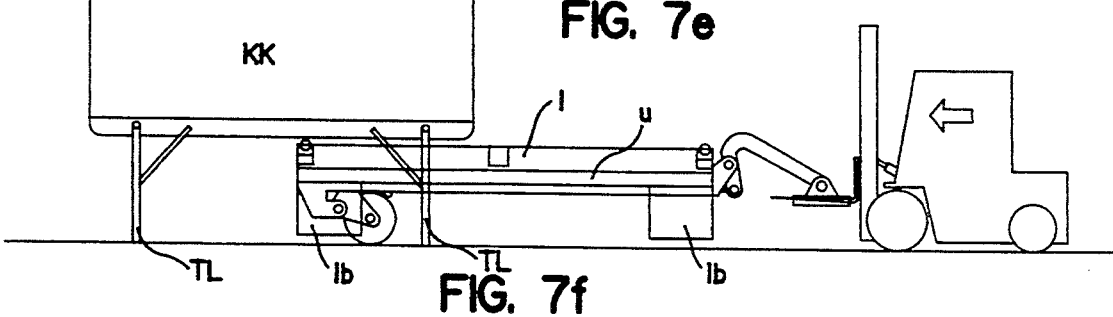
Figure 7G:
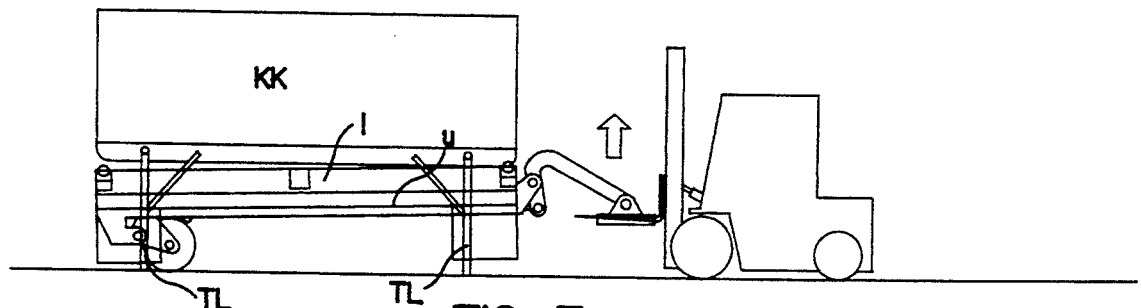
Figure 7H:
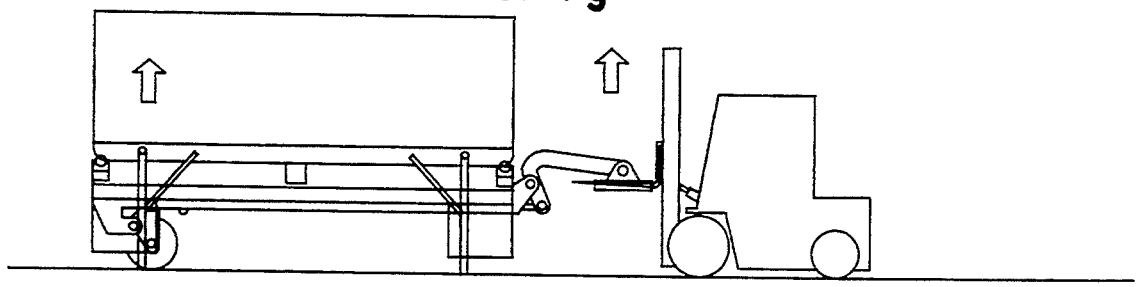
Figure 7I:
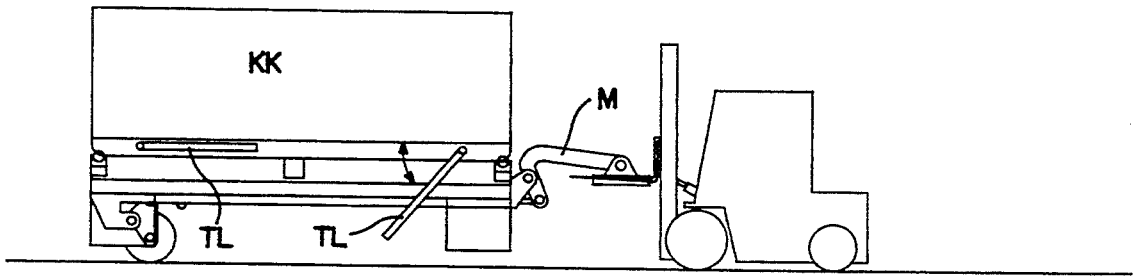
Figure 7J:
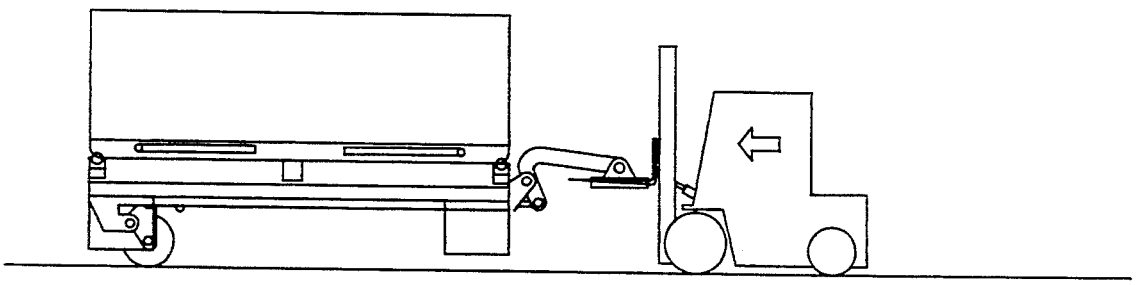
Figure 7K:
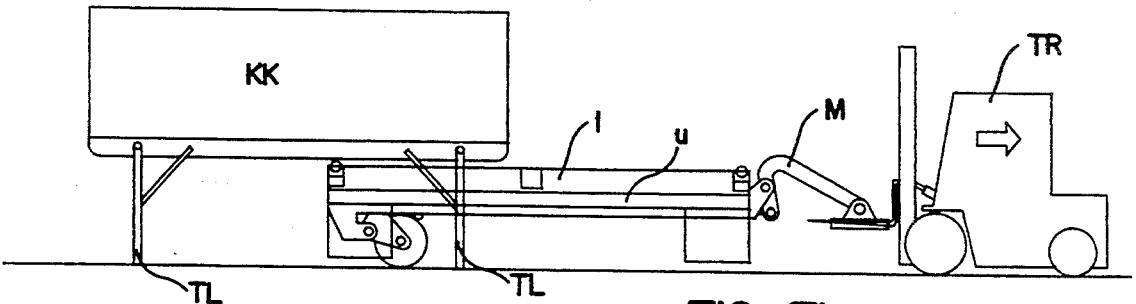

With particular reference to FIGS. 7a–l, the method according to the invention can further be applied to lifting in two phases. In the first phase shown in FIG. 7a, the first frame lever M of the lifting transport trailer is connected to a working machine, such as a forklift truck TR as shown in the figure. After this, the lifting transport trailer, which is in its lower position on the support of the forklift truck, is shifted under the support bottom 1 as shown in FIG. 7b. The support bottom 1 comprises the carrying surface 1a and the support leg arrangement 1b in connection with the same. The lifting transport trailer is placed particularly under the support level 1a of the support bottom 1, between the support leg arrangement 1b. Thus the fork part of the forklift truck TR is lifted upwards, as shown in FIG. 7c, wherein the lifting effect is directed also to the first frame lever M and the carrying surface KT in the frame u of the lifting transport trailer is lifted upwards as described above. Thus in the situation shown in FIG. 7e, the support bottom 1 is entirely above the carrying plane of the frame u of the lifting transport trailer, in its first lifted position zone. The support leg arrangement 1b is loose from the bottom. Thus according to FIG. 7f, the lifting transport trailer and the support bottom 1 lying on the support of the frame u of the same can be lifted together by a forklift truck under the load, such as an interchangeable container KK supported by the support apparatus, such as the standing legs TL, in the functional position. The placement is advantageously performed between the standing legs TL of the interchangeable container KK in the longitudinal direction of the interchangeable container KK. After this, further steps are taken in the situation shown in FIGS. 7g and 7h, in which the fork part of the forklift truck TR is lifted and thus a vertical force is effective on the frame lever M of the lifting transport trailer in a manner as described above, thus lifting the carrying surface KT of the frame u of the lifting transport trailer further, resulting in a situation as shown in FIG. 7i, in which the support bottom 1 and the interchangeable container KK above the same are in the second lifted position zone. The standing legs TL of the interchangeable container KK are thus loose from the bottom. Consequently, the interchangeable container KK lies substantially on the support of the lifting transport trailer by means of the support bottom 1. As shown in FIG. 7i, the standing legs TL of the interchangeable container KK are placed in a non-functional position, e.g. in the direction of the bottom of the interchangeable container KK. Normally, there are four standing legs, placed at the corners of each longitudinal side of the interchangeable container KK. In moving the standing legs to the non-functional position, it is essential that they are above the lower edge of the support leg arrangement 1a of the support bottom 1. Thus, as shown in FIG. 7j, the combination 1, KK can be shifted e.g. to the phase of loading or unloading goods TP by a forklift truck TR, as shown in FIG. 7l, or to the transport phase, and the fork of the forklift truck TR can be lowered, wherein the first frame lever M of the lifting transport trailer is shifted downwards and the carrying surface KT of the frame u is similarly lowered, wherein the support bottom 1 and the interchangeable container KK on the same, supported by the standing leg arrangement TL, are placed against the bottom, the lifting transport trailer reaching the lowest position. From the presentation above, the next phases of the operations are clear to an artisan in the field. Consequently, for example a situation shown in FIG. 7b corresponds to a situation in which the operations are continued after the work phase shown in FIG. 7l, wherein the steps 7d to 7e are taken, however, the interchangeable container KK lying naturally on the support bottom 1; after this, the step as shown in FIG. 7i is taken in the reverse order, i.e. the standing legs TL are moved to the functional, erected position, and, as shown in FIG. 7k, the frame of the lifting transport trailer is lowered to the first lifted position zone and the combination of the lifting transport trailer and the support bottom lying on the same is shifted away from below the interchangeable container KK supported by the standing legs TL.

Figure 8A:
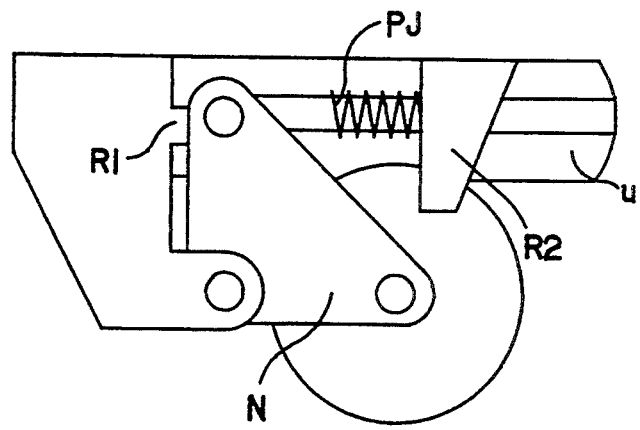
FIGS. 8a–c show a schematical side view of the operation of a spring-loaded limiter means used in the lifting transport trailer according to the invention in different positions of the lifting transport trailer.
Figure 8B:
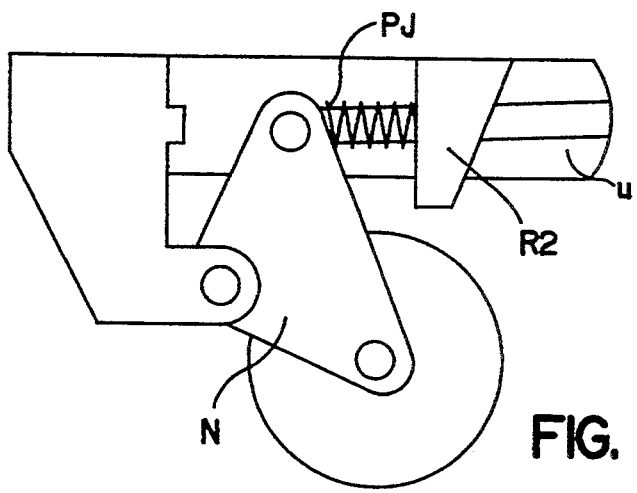
Figure 8C:
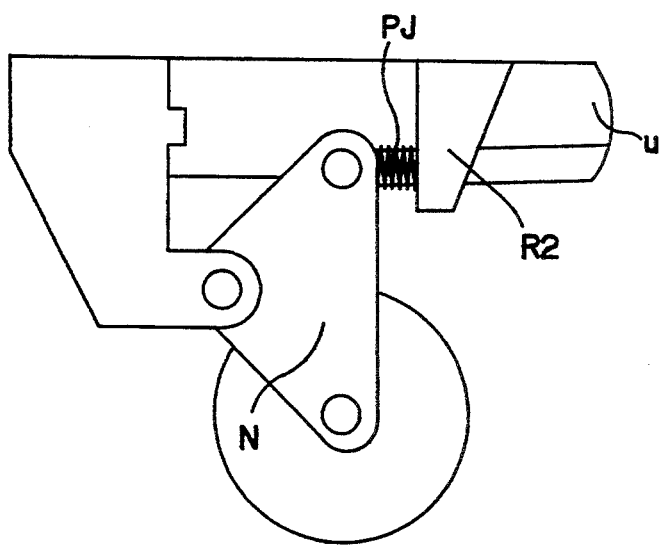

With particular reference to the advantageous embodiment shown in FIGS. 7a–l, FIGS. 8a–c the structure and operation of the functions according to FIG. 7 in different phases. In principle, the lifting transport trailer comprises elements for adjusting the height level of the upper position of the frame u on two or more levels. Functioning as the said element in connection with the second frame lever N and/or the second limiter means R2, there is a pressure spring PJ or the like with a spring constant rated and/or adjusted by adjusting elements (not presented here as a technical application obvious to an artisan in the field) for achieving at least two zones of upper position dependent on the load of the lifting transport trailer. FIG. 8a shows a situation, in which the lifting transport trailer is in the lower position zone, the second frame lever N being placed towards the first limiter means R1. Shifting to the first lifted position zone, the situation is shown in FIG. 8b (see FIGS. 7e and 7f). Further, FIG. 8c shows a situation according to the second lifted position zone (see FIGS. 7i and 7j). The pressure spring PJ is placed between the second frame lever N and the second limiter means R2 and connected to the second limiter means R2 in a manner so that, during rotation, the second frame lever N meets the said pressure spring PJ and directs a pressure load to the same, wherein the pressure spring PJ is pressed together, thus increasing the force resisting the rotation, and in a balance situation, the force by the pressure spring PJ directed to the second frame lever N being sufficiently great to stop the rotation of the frame lever, the carrying plane of the frame of the lifting transport trailer and the support bottom above the same being in the first lifted position zone. From the situation shown in FIG. 7b, the interchangeable container KK being placed above the support bottom 1, the rotation of the second frame lever N continues with an increase in the load furthering the rotation of the frame lever N, the interchangeable container being placed on the support bottom.

Explanations of the notations used:

$T_1$ = force of support reaction of the power transmission element (VE) on the second frame lever (N), $T_2$ = force of support reaction of the power transmission element (VE) on the first frame lever (M), $F_1$, $F_{01}$ = vertical force of support reaction between the rotating member (PE) and the bottom, $F_2$, $F_{02}$ = vertical force of support reaction on the first frame lever, $G_0$ = weight of the lifting transport trailer, G = weight of the load KK, $G_{tot} = G_0 + G$, L = the horizontal distance between the point of application of force $F_1$, $F_{01}$ to the rotating element PE and the point of application of force $F_2$, $F_{02}$ by said apparatus for moving said first frame lever, $l_0$ = the horizontal distance between the center of gravity of the lifting transport trailer and the point of application of the force $F_1$, $F_{01}$, to the rotating element l = the horizontal distance between the common center of gravity of the load and the lifting transport trailer and the point of application of the force $F_1$, $F_{01}$, $a_1$ = the shortest distance between the pivot point at a junction of the power transmission element and the first frame lever and the pivot point at the junction of the frame and the first frame lever, $a_2$ = the shortest distance between the line of application of force $F_1$, $F_{01}$ by said apparatus for moving said first frame lever and the pivot point at the junction of said force transmitting element and the first frame lever $b_1$ is the shortest distance between the pivot point at the junction of the frame and the second frame lever and the line of application of force $F_1$, $F_{01}$ applied to the rotating element, $b_2$ is the shortest distance between the pivot point at the junction of the frame and the second frame lever and the pivot point at the junction of the power transmission element and the second frame lever,

I claim:

1. A lifting transport trailer comprising:
   a frame having an essentially horizontal carrying surface for supporting a load and a lever mechanism for changing the elevation of said frame, said lever mechanism comprising:
   a first frame lever pivotally connected to said frame to pivot in a vertical plane, said first frame lever being connectable to apparatus for moving said first frame lever vertically;
   a second frame lever spaced apart from said first frame lever and pivotally connected to said frame to pivot in a vertical plane, said second frame lever being provided with at least one supporting wheel, said at least one supporting wheel being positioned at a lower elevation than said carrying surface;
   at least one force transmitting element interconnecting said first and second frame levers for transmitting vertical pivoting motion of said first frame lever into vertical pivoting motion of said second frame lever and thereby changing the vertical distance between said horizontal carrying surface and said supporting wheel(s);
   first and second limiter means provided on said frame for restricting the pivoting movement of said second frame lever, thereby restricting the change in vertical distance between said horizontal carrying surface and said supporting wheel(s);
   means connected between said second frame lever and said second limiter means for limiting the lifting position of the frame according to the weight applied to said carrying surface by the load therein, wherein;
   when said lever mechanism is in a first position supported by said first limiter means, said frame is supported by said wheel(s) in a lower position and when said lever mechanism is in a second position supported by said second limiter means, said frame is supported by said wheel(s) in an upper position, and in both positions said lifting transport trailer forms a functionally stiff body which is pivoted around a connecting point between said wheel(s) and said second frame lever during a change of the height position of said first frame lever.

2. A lifting transport trailer according to claim 1, wherein said load supported by said carrying surface is supported on said carrying surface in a position to assist in the operation of said trailer.

3. A lifting transport trailer according to claim 1, wherein said frame includes a mass movable in the longitudinal direction of said frame.

4. A lifting transport trailer according to claim 1, including at least one pivot point which is movable with respect to said lever mechanism.

5. A lifting transport trailer according to claim 1, wherein said limiter means are positioned beneath said frame.

6. A lifting transport trailer according to claim 1, wherein said force transmitting element comprises at least one bar.

7. A lifting transport trailer according to claim 1, wherein said force transmitting element comprises at least one wire cable.

8. A lifting transport trailer according to claim 1, wherein said force transmitting element comprises fluid pressure medium.

9. A lifting transport trailer according to claim 1, including means for adjusting the height of the upper position of the frame in at least two positions.

10. A lifting transport trailer according to claim 1, wherein said means for limiting the lifted position of the frame is a spring.

11. A lifting transport trailer according to claim 10, wherein said spring is provided with adjustment means for achieving at least two zones of upper positions dependent on the magnitude of said load.

12. A method for providing lifting forces on a lifting transport trailer for self-loading, moving, and self-unloading a load wherein said trailer comprises a frame with a substantially horizontal planar carrying surface and a lifting lever mechanism for changing the elevation of said carrying surface, said lever mechanism comprising:

a first frame lever pivotally connected to said frame to rotate in a substantially vertical plane with respect to said carrying surface, and connectable to apparatus for moving said frame lever and said frame vertically between lower and upper positions;

a second frame lever spaced apart from said first frame lever and pivotally connected to said frame to rotate in a substantially vertical plane with respect to said carrying surface, said second frame lever being provided with at least one supporting rotatable element;

at least one force transmitting element interconnecting said first and second frame levers for transmitting a vertical, pivotal motion of said first frame lever into a vertical pivotal motion of said second frame lever for changing the vertical distance between said carrying surface and said at least one supporting rotatable element; and first and second limiter means provided on said frame for restricting the change in vertical distance between said carrying surface and said at least one supporting rotatable element, wherein said method comprises the following steps:

selecting factors from the group consisting of $a_1$, $a_2$, $b_1$, $b_2$, $l_0$, L, G, and $G_0$ which have an effect on the magnitude of moments about a pivot point of said second frame lever with respect to said frame so that the lifting transport trailer functions during shifting thereof as a stiff body in at least two positions, wherein in a first position the sum of the moments about the pivot point acts in a first direction so that the lever mechanism comprising said first and second frame levers and said at least one force transmitting element is supported against said first limiter means, the horizontal carrying surface being in a lowered position, and in a second position the sum of the moments about said pivot point acts in a second direction so that said lever mechanism is supported against said second limiter means, the horizontal carrying surface being in an upper position;

selecting said factors so that the sum of the said pivot point acts so that said carrying surface is in a lowered position;

placing said trailer under said load;

changing at least one of said factors so that the sum of the moments about the pivot point of said second frame lever is changed to act in a second direction which is opposite to said first direction, wherein the lifting transport trailer functions during shifting thereof as a stiff body in said second position so that the lever mechanism is supported against said second limiter means, the horizontal carrying surface being in an upper position raising the first frame lever whereby the lifting transport trailer is pivoted in a first position as a stiff body so that the carrying surface meets the load, or a support device connected to the load, the frame thus being subjected to a force applied by said load to thereby change the direction of the moments about the pivot point of the second frame lever to the opposite direction and thus bringing the trailer to a second position; and placing said load in relation to the carrying manner such that the position of the center of gravity of the frame and the load in relation to the center of gravity of the frame is changed to arrest the trailer in said second position; and, wherein said factors are defined as follows:

$a_1$ is the shortest distance between the pivot point at a junction of the power transmission element and the first frame lever and the pivot point at the junction of the frame and the first frame lever;

$a_2$ is the shortest distance between the line of application of force by said apparatus for moving said first frame lever and the pivot point at the junction of said force transmitting element and the first frame lever;

$b_1$ is the shortest distance between the pivot point at the junction of the frame and the second frame lever and the line of application of force applied to the rotating element;

$b_2$ is the shortest distance between the pivot point at the junction of the frame and the second frame lever and the pivot point at the junction of the power transmission element and the second frame lever;

$l_0$ is the horizontal distance between center of gravity of the lifting transport trailer and the point of application of force to the rotating element;

L is the horizontal distance between the point of application of force to the rotating element and the point of application of force by said apparatus for moving said first frame lever;

G is the weight of said load; and $G_0$ is the weight of the lifting transport trailer.

* * * * *